(12) United States Patent
Han et al.

(10) Patent No.: US 9,830,025 B2
(45) Date of Patent: Nov. 28, 2017

(54) INTEGRATED TOUCH DISPLAY DEVICE FOR DISPLAYING IMAGE AND PERFORMING TOUCH SENSING THROUGH TIME-DIVISIONAL MULTIPLEXING

(71) Applicant: LG Display Co., Ltd., Seoul (KR)

(72) Inventors: Man Hyeop Han, Seoul (KR); Cheol Se Kim, Daegu (KR); Ju Han Kim, Bucheon-si (KR); Sang Soo Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 189 days.

(21) Appl. No.: 14/101,059

(22) Filed: Dec. 9, 2013

(65) Prior Publication Data

US 2015/0062062 A1 Mar. 5, 2015

(30) Foreign Application Priority Data

Sep. 4, 2013 (KR) .......................... 10-2013-0106008

(51) Int. Cl.
*G06F 3/045* (2006.01)
*G06F 3/041* (2006.01)
*G06F 3/044* (2006.01)

(52) U.S. Cl.
CPC ............ *G06F 3/044* (2013.01); *G06F 3/0412* (2013.01); *G06F 2203/04106* (2013.01)

(58) Field of Classification Search
CPC .................. G06F 3/044; G06F 3/0412; G06F 2203/04106

(Continued)

(56) References Cited

U.S. PATENT DOCUMENTS 7,859,521 B2 * 12/2010 Hotelling .............. G06F 3/0412
178/18.03
8,884,917 B2 * 11/2014 Seo ....................... G06F 1/3262
345/174

(Continued)

FOREIGN PATENT DOCUMENTS

CN 101825966 9/2010
CN 101847071 9/2010

(Continued)

OTHER PUBLICATIONS

Decision of Rejection for Japanese Patent Application No. JP 2013-262169, Jul. 21, 2015, 6 Pages.

(Continued)

*Primary Examiner* — Kwang-Su Yang
(74) *Attorney, Agent, or Firm* — Fenwick & West LLP (57) ABSTRACT

Disclosed is a display device integrated with a touch screen. The display device includes a panel configured to include a plurality of first electrodes arranged in parallel in a first direction and a plurality of second electrodes arranged in parallel in a second direction, a switching unit configured to apply a common voltage to the plurality of first and second electrodes when the panel operates in a display driving mode, and when the panel operates in a touch driving mode, apply a first touch scan pulse to the plurality of first electrodes during a first period, and apply a second touch scan pulse to the plurality of first and second electrodes during a second period, a first touch sensing unit configured to apply the first touch scan pulse to the switching unit, and a second touch sensing unit configured to apply the second touch scan pulse to the switching unit.

23 Claims, 10 Drawing Sheets

(58) Field of Classification Search
USPC .......................................................... 345/174
See application file for complete search history.

(56) References Cited

U.S. PATENT DOCUMENTS

| | | | |
|---|---|---|---|
| 9,182,860 B2* | 11/2015 | Takashima | .............. G06F 3/044 |
| 2010/0110038 A1* | 5/2010 | Mo | .......................... G06F 3/044 345/174 |
| 2011/0157068 A1 | 6/2011 | Parker et al. | |
| 2011/0227868 A1 | 9/2011 | Chen et al. | |
| 2011/0234523 A1* | 9/2011 | Chang | ...................... G06F 3/044 345/173 |
| 2011/0279408 A1* | 11/2011 | Urano | ...................... G06F 3/044 345/174 |
| 2012/0056835 A1 | 3/2012 | Choo et al. | |
| 2012/0098776 A1 | 4/2012 | Chen et al. | |
| 2012/0194471 A1 | 8/2012 | Park et al. | |
| 2012/0262411 A1 | 10/2012 | Ahn et al. | |
| 2013/0038570 A1 | 2/2013 | Seo et al. | |
| 2013/0077018 A1 | 3/2013 | Kuniyoshi et al. | |
| 2013/0093711 A1* | 4/2013 | Liu | ......................... G06F 3/044 345/174 |
| 2013/0147724 A1 | 6/2013 | Hwang et al. | |
| 2013/0154996 A1 | 6/2013 | Trend et al. | |
| 2013/0176276 A1 | 7/2013 | Shepelev | |
| 2013/0194229 A1 | 8/2013 | Sabo et al. | |
| 2013/0194231 A1 | 8/2013 | Smith et al. | |
| 2015/0077387 A1* | 3/2015 | Han | ......................... G06F 3/044 345/174 |
| 2015/0363032 A1 | 12/2015 | Hotelling et al. | |
| 2016/0259460 A1* | 9/2016 | Yang | ................... G02F 1/13338 |

FOREIGN PATENT DOCUMENTS

| | | |
|---|---|---|
| CN | 102681715 | 9/2012 |
| DE | 202012101478 U1 | 5/2012 |
| JP | H11-249813 A | 9/1999 |
| JP | 2013122752 A | 6/2013 |
| WO | WO 2011/152348 A1 | 12/2011 |
| WO | WO 2013/046513 A1 | 4/2013 |

OTHER PUBLICATIONS

Office Action for Chinese Patent Application No. CN 201310684137.9, dated Nov. 28, 2016, 10 Pages, (With Concise Explanation of Relevance).

* cited by examiner

INTEGRATED TOUCH DISPLAY DEVICE FOR DISPLAYING IMAGE AND PERFORMING TOUCH SENSING THROUGH TIME-DIVISIONAL MULTIPLEXING

CROSS-REFERENCE TO RELATED APPLICATIONS

This application claims priority under 35 U.S.C. §119(a) of Korean Patent Application No. 10-2013-0106008 filed on Sep. 4, 2013, which is hereby incorporated by reference as if fully set forth herein.

BACKGROUND

Field of the Invention

The present invention relates to a display device, and more particularly, to a touch integrated circuit (IC) and a display device integrated with a touch screen and using the same.

Discussion of the Related Art

A touch screen is a type of input device that is included in display devices such as liquid crystal display (LCD) devices, field emission displays (FEDs), plasma display panels (PDPs), electroluminescent displays (ELDs), and electrophoretic displays (EPDs), and enables a user to input information by directly touching a screen with a finger, a pen or the like while looking at the screen of the display device.

Particularly, the demand for display devices with an integrated in-cell type touch screen, which include a plurality of built-in elements configuring the touch screen for slimming portable terminals such as smart phones and tablet personal computers (PCs), is recently increasing.

In a related art display device with the integrated in-cell type touch screen disclosed in U.S. Pat. No. 7,859,521, a plurality of common electrodes for display are segmented into a plurality of touch driving areas and touch sensing areas, thereby allowing a mutual capacitance to be generated between the touch driving area and the touch sensing area. Therefore, the related art display device measures the change of a mutual capacitance that occurs due to a touch, and thus determines whether there is the touch.

In sensing the touch by using the mutual capacitive type, when a touched area is very small, it is difficult to sense the touch because a capacitance change is too small.

Specifically, in a pen touch input which is mainly used recently, since a pen touch area is far smaller than a finger touch area which is a typical input, it is difficult to sense a pen touch. Therefore, a separate pen touch input device is needed for sensing the pen touch.

SUMMARY

Accordingly, the present invention is directed to provide a touch integrated circuit (IC) and a display device integrated with a touch screen using the same that substantially obviates one or more problems due to limitations and disadvantages of the related art.

An aspect of the present invention is directed to provide a display device integrated with touch screen which includes a touch IC for sensing a finger touch and a pen touch, and can sense the pen touch as well as the finger touch without a separate additional device.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device integrated with touch screen including: a panel configured to include a plurality of first electrodes, which are arranged in parallel and in a first direction, and a plurality of second electrodes, which are arranged in parallel and in a second direction; a switching unit configured to apply a common voltage to the plurality of first and second electrodes when the panel operates in a display driving mode, and when the panel operates in a touch driving mode, apply a first touch scan pulse to the plurality of first electrodes during a first period, and apply a second touch scan pulse to the plurality of first and second electrodes during a second period; a first touch sensing unit configured to apply the first touch scan pulse to the switching unit; and a second touch sensing unit configured to apply the second touch scan pulse to the switching unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

Figure (FIG. 1) is a diagram schematically illustrating a configuration of a display device integrated with touch screen according to embodiments of the present invention.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, various embodiments of the present invention will be described in detail with reference to the accompanying drawings.

In this disclosure below, for convenience of description, an LCD device will be described as an example of a display device with an integrated touch screen according to various embodiments of the present invention, but the present invention may be applied to various display devices such as LCD devices, FEDs, PDPs, ELDs, and EPDs without being limited thereto. Also, a description on a general configuration of the LCD device is not provided.

Figure 1:
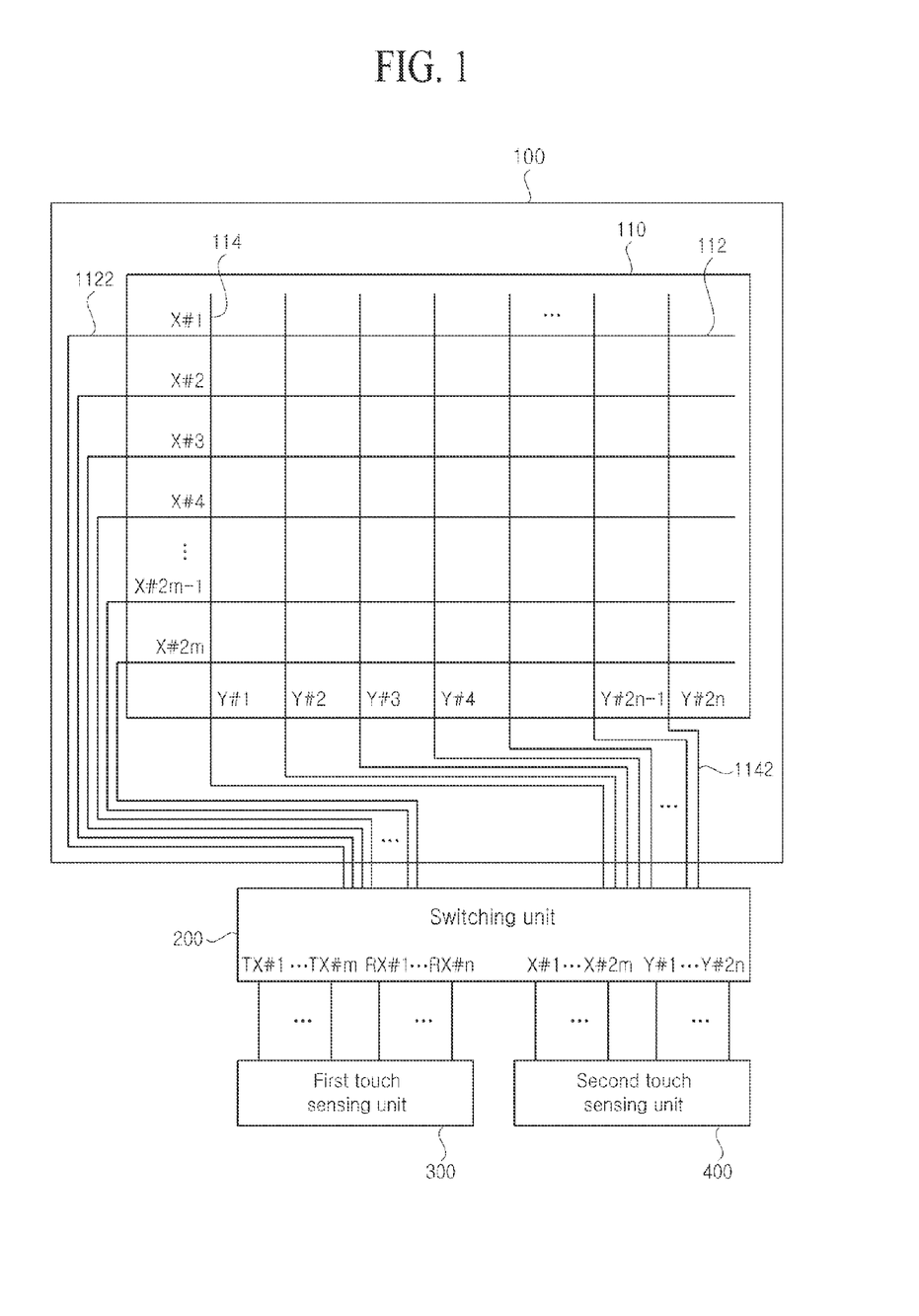
Figure 2:
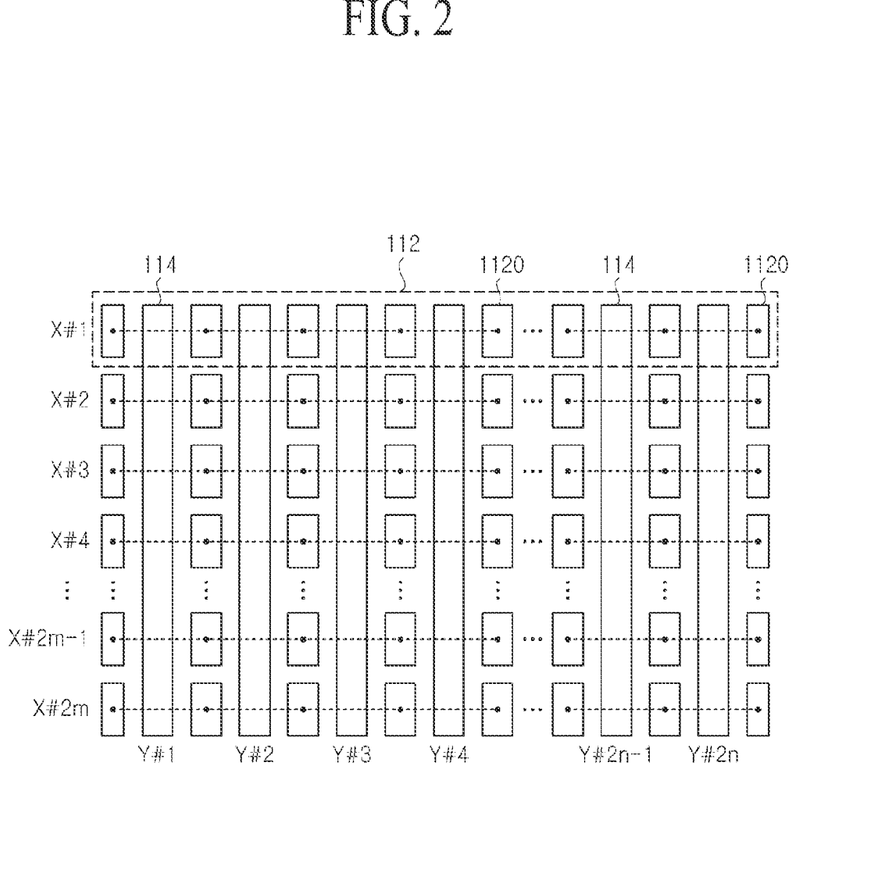
FIG. 2 is a diagram illustrating an example of a detailed structure of a plurality of first electrodes and a plurality of second electrodes illustrated in FIG. 1.

FIG. 1 is a diagram schematically illustrating a configuration of a display device integrated with touch screen according to embodiments of the present invention, and FIG. 2 is a diagram illustrating an example of a detailed structure of a plurality of first electrodes and a plurality of second electrodes illustrated in FIG. 1.

As illustrated in FIG. 1, the display device integrated with touch screen includes a panel 100, a switching unit 200, a first touch sensing unit 300, and a second touch sensing unit 400.

First, a touch screen is built into the panel 100. The touch screen 110 includes a plurality of first electrodes 112 and a plurality of second electrodes 114. The plurality of first electrodes 112 are arranged in parallel and in a first direction, and the plurality of second electrodes 114 are arranged in parallel and in a second direction. Also, the plurality of first electrodes 112 are connected to the switching unit 200 through a plurality of first electrode lines 1122, and the plurality of second electrodes 114 are connected to the switching unit 200 through a plurality of second electrode lines 1142.

For example, as illustrated in FIG. 2, a plurality of first sub-electrodes 1120 may be connected to each other to configure one first electrode 112, and may be arranged in parallel and in a first direction of a width direction which is a gate line (not shown) direction of the panel 100. Also, although not shown, the plurality of first sub-electrodes 1120 may be electrically connected to each other in a non-display area of the panel 100 to configure one first electrode 112.

The plurality of second electrodes 114, as illustrated in FIG. 2, may be arranged in parallel, in a second direction of a height direction which is a data line (not shown) direction of the panel 100, and between each of the plurality of first sub-electrodes 1120.

For example, the plurality of first electrodes 112 and the plurality of second electrodes 114 may perform a function of a common electrode when the display device integrated with the touch screen operates in a display driving mode, or perform a function of a touch electrode when the display device integrated with the touch screen operates in a touch driving mode.

In other words, the plurality of first and second electrodes 112 and 114 of the display device integrated with the touch screen according to embodiments of the present invention may perform the function of the touch electrode for sensing a touch, in addition to the function of the common electrode for displaying an image.

For example, each of the plurality of first electrodes 112 may be formed as a common electrode consisting of a plurality of blocks which are formed to overlap a plurality of unit pixel areas, and each of the plurality of second electrodes 114 may be formed as a common electrode consisting of one block which is formed to overlap the plurality of unit pixel areas.

The plurality of first and second electrodes 112 and 114 need to act as the common electrode used to drive a liquid crystal, and thus may be formed of a transparent material such as indium oxide titanium (ITO) or the like.

When the panel 100 operates in the display driving mode, the switching unit 200 applies the common voltage to the plurality of first and second electrodes 112 and 114. When the panel 100 operates in the touch driving mode, the switching unit 200 applies a first touch scan pulse to the plurality of first electrodes 112 during a first period, and applies a second touch scan pulse to the plurality of first and second electrodes 112 and 114 during a second period.

Hereinafter, a configuration and driving timing of the switching unit will be described in more detail with reference to FIGS. 3 to 8.

Figure 3:
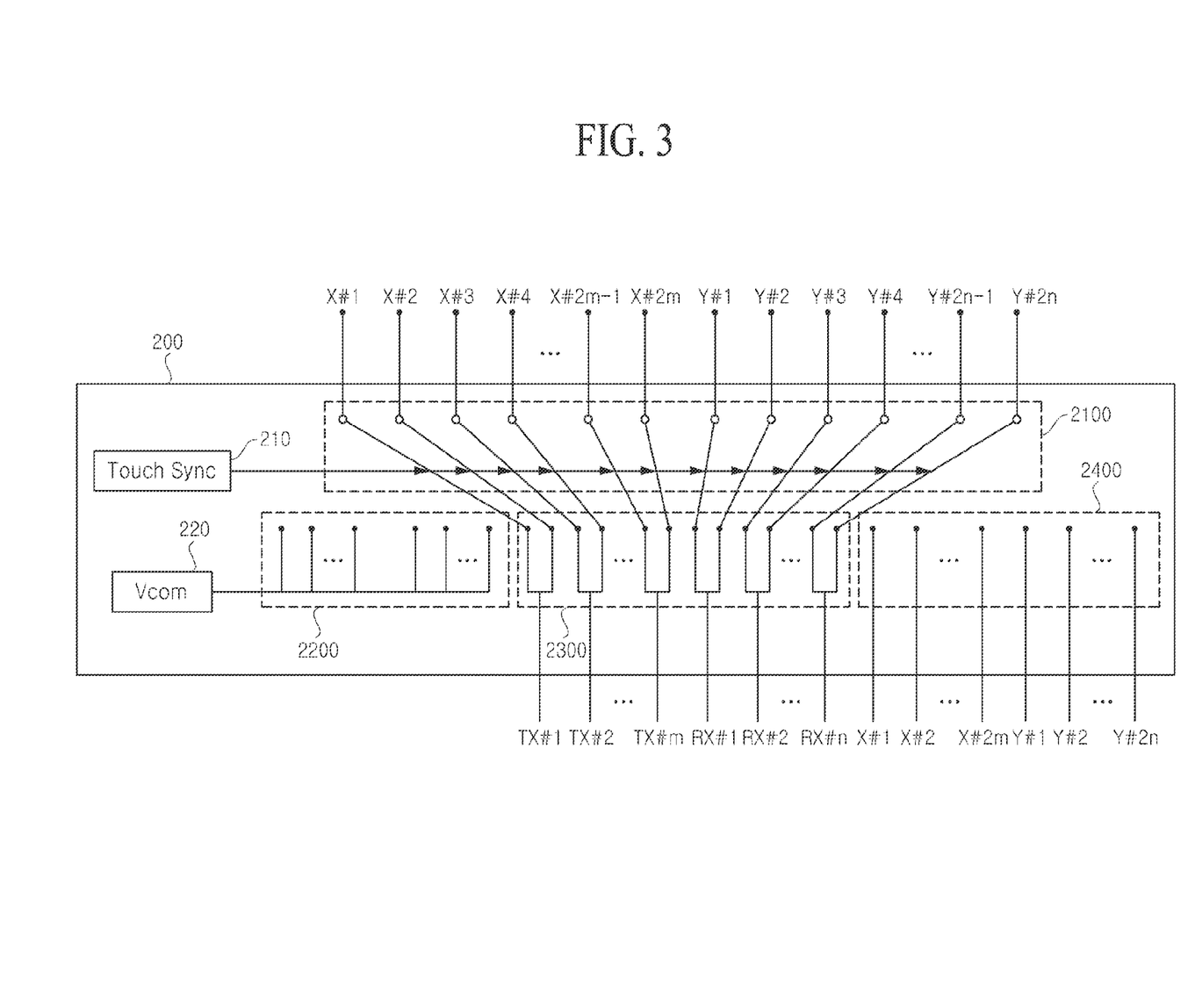
FIG. 3 is a diagram illustrating an example of a configuration of a switching unit illustrated in FIG. 1.
Figure 4:
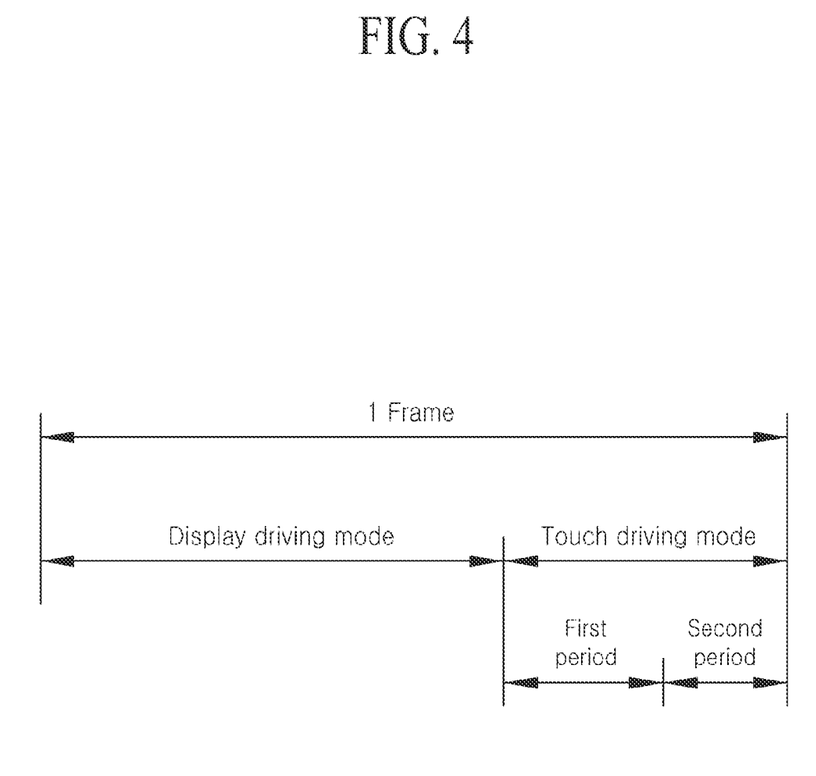
FIG. 4 is a timing chart showing an example of a method of driving the display device integrated with touch screen according to embodiments of the present invention.
Figure 5:
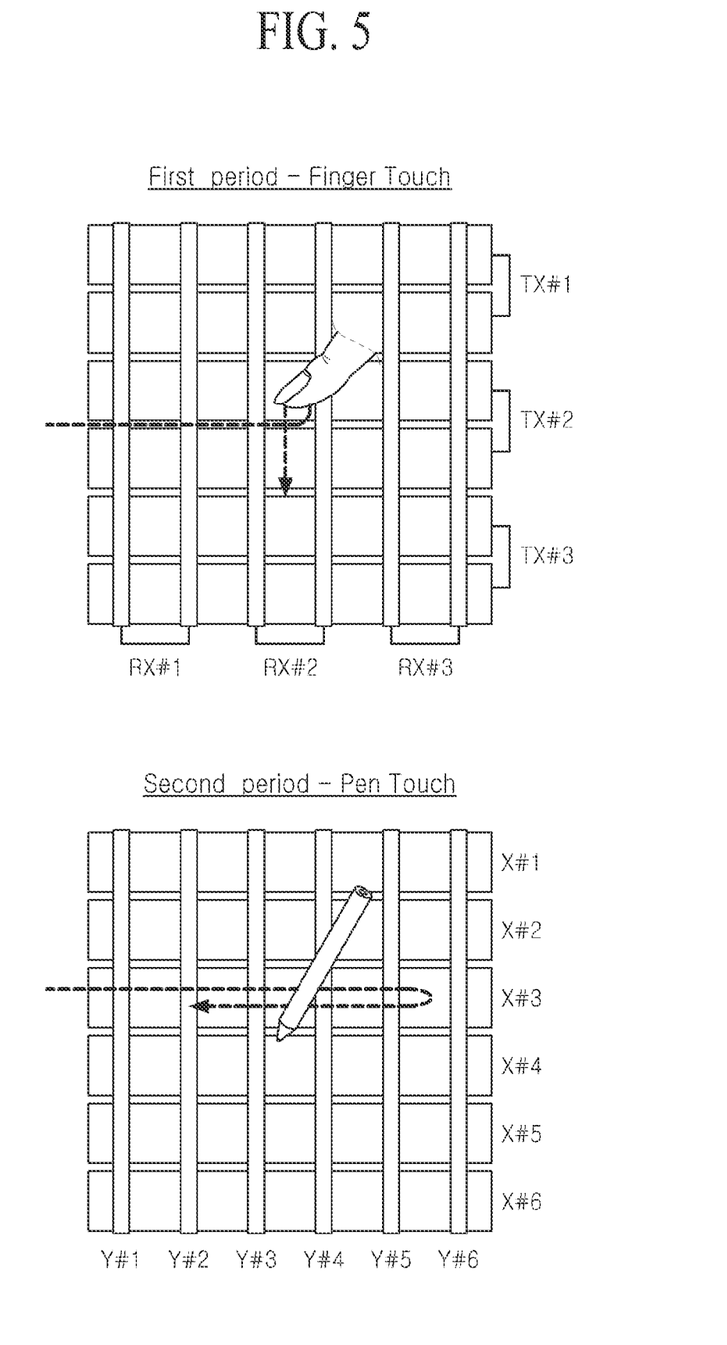
FIG. 5 is a diagram illustrating an example of a touch driving method during a first period and a second period in a touch driving mode of FIG. 4.

FIG. 3 is a diagram illustrating an example of a configuration of the switching unit illustrated in FIG. 1, and FIG. 4 is a timing chart showing an example of a method of driving the display device integrated with the touch screen according to embodiments of the present invention. FIG. 5 is a diagram illustrating an example of a touch driving method during the first period and the second period in the touch driving mode of FIG. 4, and FIGS. 6 to 8 are diagrams respectively illustrating examples of a connection state between electrodes in the display driving mode and the touch driving mode of FIG. 4.

The switching unit 200, as illustrated in FIG. 3, may include a sync signal generator 210, a switch 2100, a common voltage generator 220, a common voltage connector 2200, a first touch sensing unit connector 2300, and a second touch sensing unit connector 2400.

The sync signal generator 210 may generate a sync signal (Touch Sync) that indicates the driving mode of the panel 100. For example, the sync signal may include a first sync signal that indicates the display driving mode, a second sync signal that indicates the touch driving mode during the first period, and a third sync signal that indicates the touch driving mode during the second period.

For example, as illustrated in FIG. 4, the display device integrated with the touch screen according to embodiments of the present invention may be temporally divided into the display driving mode and the touch driving mode during one frame, and may operate in the display driving mode and the touch driving mode. The touch driving mode may be temporally divided into the first period and the second period, and may operate in the first period and the second period.

Therefore, when the panel 100 operates in the display driving mode, the sync signal generator 210 may output the first sync signal to the switch 2100. When the panel 100 operates in the touch driving mode, the sync signal generator 210 may output the second sync signal to the switch 2100 during the first period, and during the second period, the sync signal generator 210 may output the third sync signal to the switch 2100.

For example, as illustrated in FIG. 5, the display device integrated with the touch screen according to embodiments of the present invention may sense a finger touch in a mutual capacitive type during the first period, and during the second period, the display device may sense a pen touch in a self-capacitive type. Although not shown, the display device may sense the pen touch in the self-capacitive type during the first period, and may sense the finger touch in the mutual capacitive type during the second period.

When the first sync signal is input, the switch 2100 connects the plurality of first and second electrodes 112 and 114 to the common voltage connector 2200. When the second sync signal is input, the switch 2100 connects the plurality of first and second electrodes 112 and 114 to the first touch sensing unit connector 300. When the third sync signal is input, the switch 2100 connects the plurality of first and second electrodes 112 and 114 to the second touch sensing unit connector 400.

The common voltage generator 220 may generate the common voltage (Vcom), and supply Vcom to the common voltage connector 2200. In FIG. 3, the common voltage is illustrated as being generated, but the Vcom may be generated in and input from the outside of the switching unit 200. The present invention is not limited thereto.

The common voltage connector 2200 may connect each of plurality of first electrodes 112 and the plurality of second electrodes 114 to the common voltage generator 220 according to an operation of the switch 2100 which is performed by the first sync signal.

Therefore, the common voltage connector 2200 may receive Vcom from the common voltage generator 220, and apply the common voltage to the plurality of first and second electrodes 112 and 114.

Figure 6:
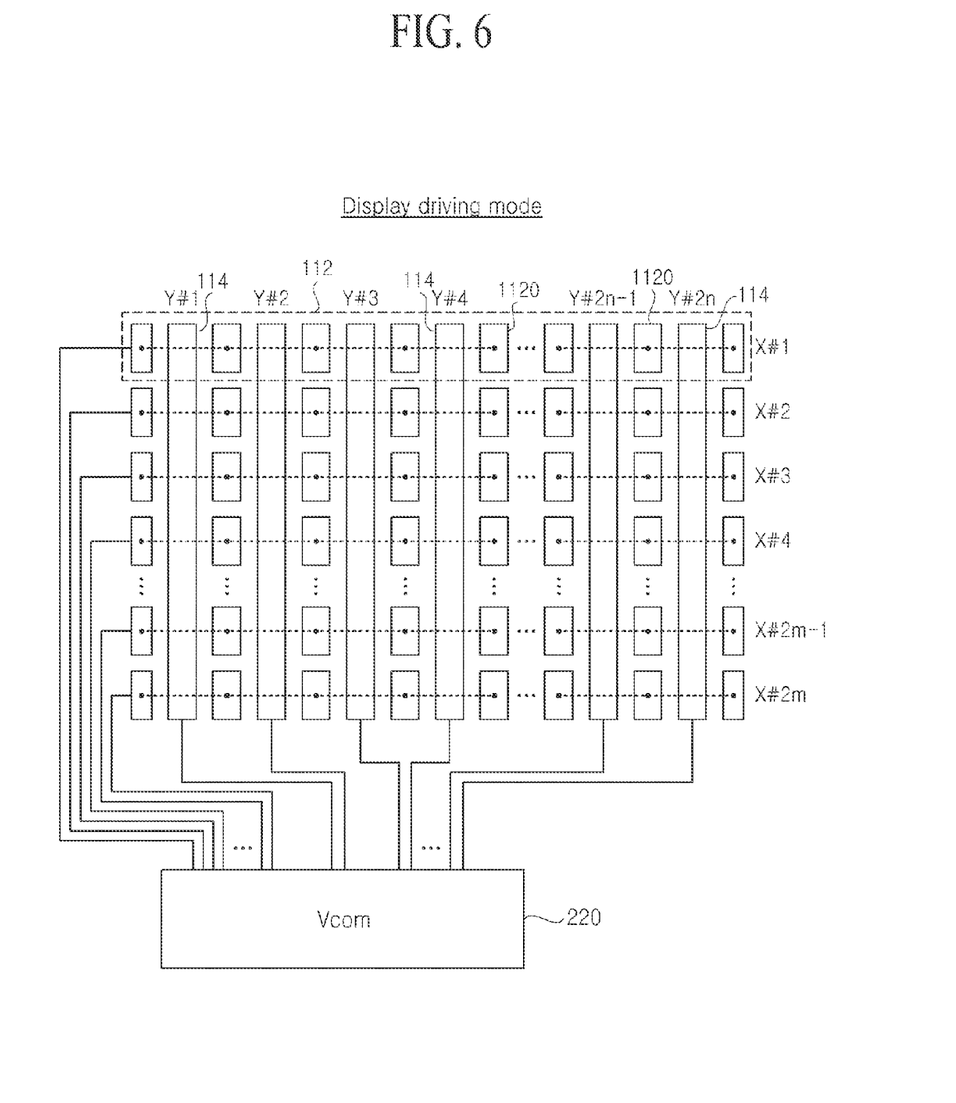
FIGS. 6 to 8 are diagrams respectively illustrating examples of a connection state between electrodes in a display driving mode and the touch driving mode of FIG. 4.

As a result, as illustrated in FIG. 6, when the panel 100 operates in the display driving mode according to the first sync signal, the plurality of first and second electrodes 112 and 114 may be connected to the common voltage generator 220.

The first touch sensing unit connector 2300 may group the plurality of first electrodes 112 in units of two electrodes to connect the grouped first electrodes to the first touch sensing unit 300, and may group the plurality of second electrodes 114 in units of two electrodes to connect the grouped second electrodes to the second touch sensing unit 400, according to an operation of the switch 2100 which is performed by the second sync signal during the first period.

For example, as illustrated in FIG. 3, the first touch sensing unit connector 2300 may group the plurality of first electrodes 112 in units of two electrodes to connect the grouped first electrodes to the first touch sensing unit 300, and may group the plurality of second electrodes 114 in units of two electrodes to connect the grouped second electrodes to the second touch sensing unit 400. Also, although not shown, the first touch sensing unit connector 300 may group the plurality of first and second electrodes 112 and 114 in units of two or more electrodes to connect the grouped first and second electrodes to the first touch sensing unit 300.

Therefore, the first touch sensing unit connector 2300 may transfer one first touch scan pulse each, applied from the first touch sensing unit 300, to the two first electrodes 112 during the first period, and transfer first touch sensing signals, received from two second electrodes 114 each, to the first touch sensing unit 300. In other words, when the panel 100 operates in the touch driving mode, the plurality of first electrodes 112 may perform a function of the touch driving electrode, and the plurality of second electrodes 114 may perform a function of the touch sensing electrode.

Figure 7:
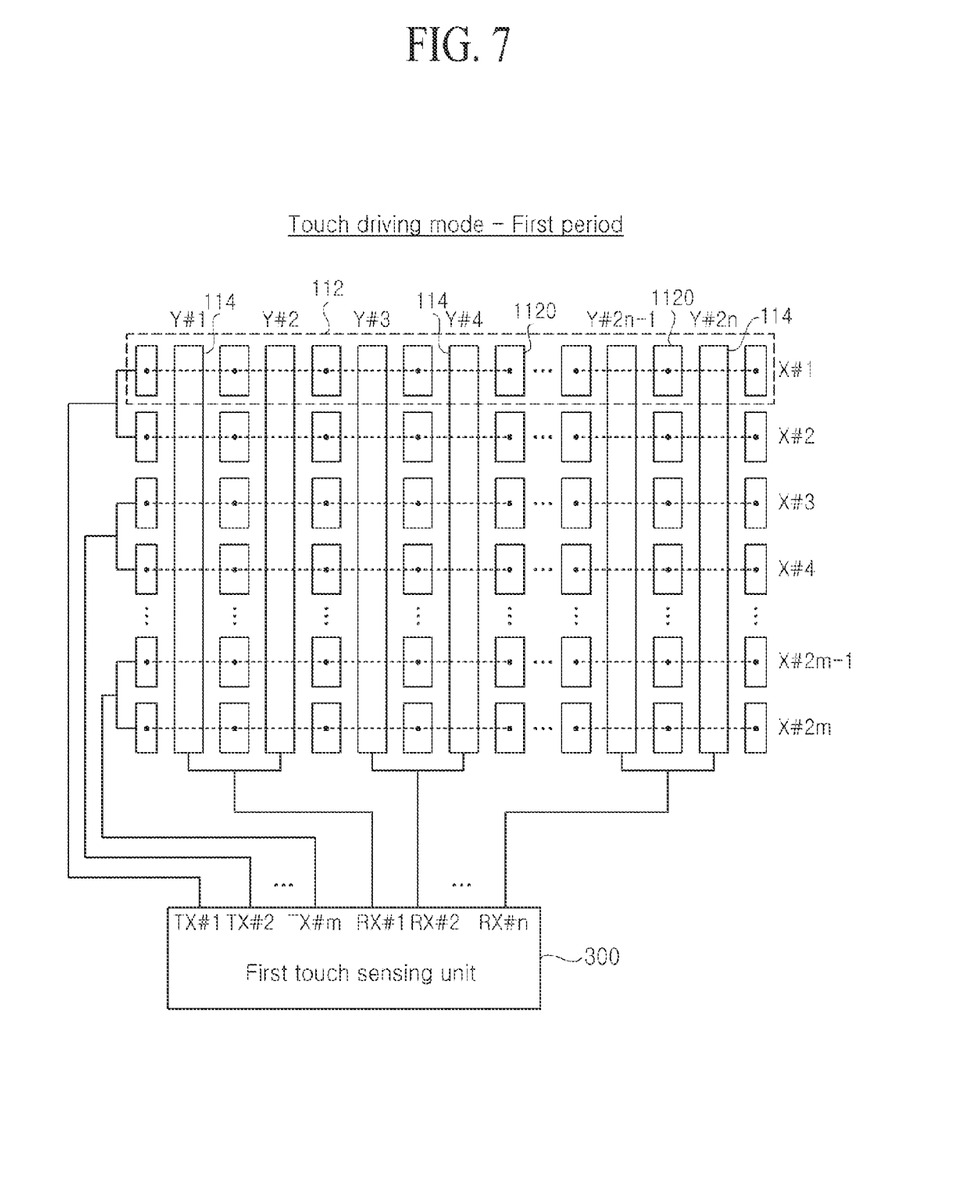

As a result, as illustrated in FIG. 7, when the panel 100 operates in the touch driving mode according to the second sync signal, the plurality of first and second electrodes 112 and 114 may be connected to the first touch sensing unit 300 in units of two electrodes.

The second touch sensing unit connector 2400 may connect each of the plurality of first electrodes 112 and the plurality of second electrodes 114 to the second touch sensing unit 400 according to an operation of the switch 2100 which is performed by the third sync signal during the second period.

For example, as illustrated in FIG. 3, the second touch sensing unit connector 2400 may connect the plurality of first and second electrodes 112 and 114 to the second touch sensing unit 400 in one-to-one correspondence relationship.

Therefore, the second touch sensing unit connector 2400 may transfer a second touch scan pulse, applied from the second touch sensing unit 400, to the plurality of first and second electrodes 112 and 114 during the second period, and transfer a second touch sensing signal, received from each of the plurality of first and second electrodes 112 and 114, to the second touch sensing unit 400.

Figure 8:
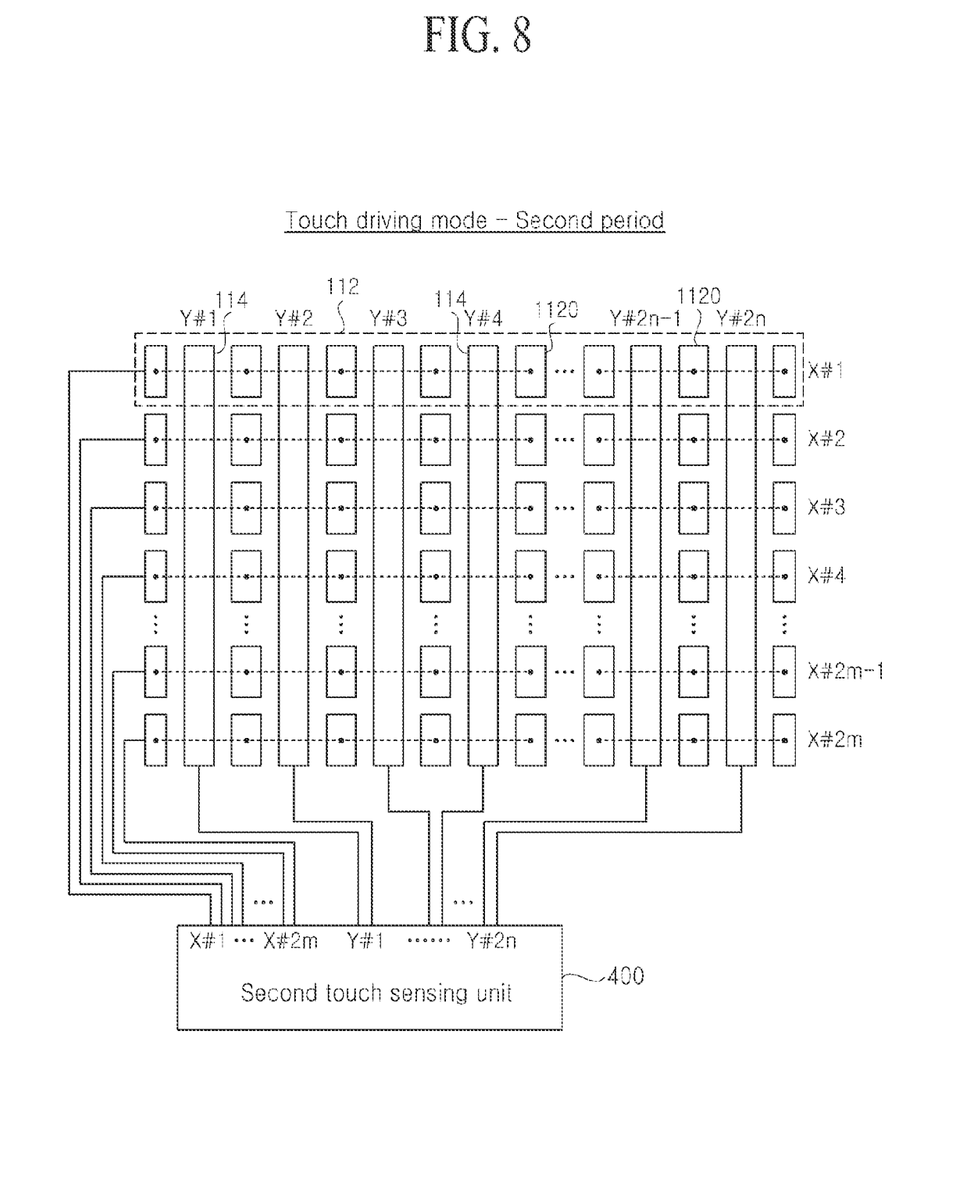

As a result, as illustrated in FIG. 8, when the panel 100 operates in the touch driving mode during the second period according to the third sync signal, the plurality of first and second electrodes 112 and 114 may be connected to the second touch sensing unit 400.

In other words, during the first period, the display device groups the plurality of first and second electrodes 112 and 114 in units of two electrodes to determine whether there is a touch in the mutual capacitive type, and during the second period, the display device determines whether there is a touch for each of the first and second electrodes 112 and 114 in the self-capacitive type. In comparison with the first period, during the second period, a size of the touch sensing unit is reduced. Accordingly, the second period is suitable to sense the pen touch based on the self-capacitive type enabling a single touch to be sensed, and the first period is suitable to sense the finger touch based on the mutual capacitance type enabling a multi-touch to be sensed.

Therefore, the display device integrated with the touch screen according to embodiments of the present invention temporally divides the touch driving mode into the first and second periods, and by using the plurality of first and second electrodes 112 and 114, can sense the pen touch as well as the finger touch without providing a separate device for sensing the pen touch. Also, a size of a touch sensing unit for sensing the pen touch is smaller than that of a touch sensing unit for sensing the finger touch, and thus, a degree of accuracy for sensing the pen touch can be enhanced.

Referring again to FIGS. 1 and 2, the first touch sensing unit 300 applies the first touch scan pulse to the switching unit 200, and the second touch sensing unit 400 applies the second touch scan pulse to the switching unit 200.

For example, the first touch sensing unit 300 may determine whether there is a touch in the mutual capacitive type. The first touch sensing unit 300 may apply the first touch scan pulse to the plurality of first electrodes 112 through the switching unit 200 during the first period, and receive a plurality of first touch sensing signals from the plurality of second electrodes 114 through the switching unit 200 to determine whether there is a touch.

The second touch sensing unit 400 may determine whether there is a touch in the self-capacitive type. The second touch sensing unit 400 may apply the second touch scan pulse to the plurality of first and second electrodes 112 and 114 through the switching unit 200 during the second period, and receive a plurality of second touch sensing signals from the plurality of first and second electrodes 112 and 114 through the switching unit 200 to determine whether there is a touch.

Therefore, the display device integrated with the touch screen according to embodiments of the present invention can sense a touch in the mutual capacitive type for sensing the finger touch, and moreover sense a touch in the self-capacitive type for sensing the pen touch.

The switching unit, the first touch sensing unit, and the second touch sensing unit may be included in a circuit unit for driving the display device integrated with touch screen according to embodiments of the present invention. Hereinafter, a description on this will be made in more detail with reference to FIGS. 9 to 11.

Figure 9:
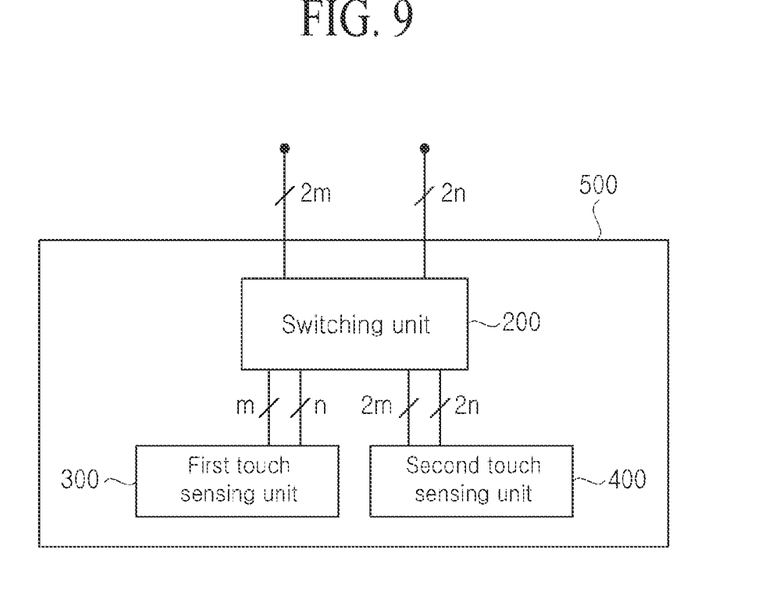
FIGS. 9 to 11 are diagrams illustrating embodiments of circuit units including a switching unit, first touch sensing unit, and second touch sensing unit of FIG. 1.
Figure 10:
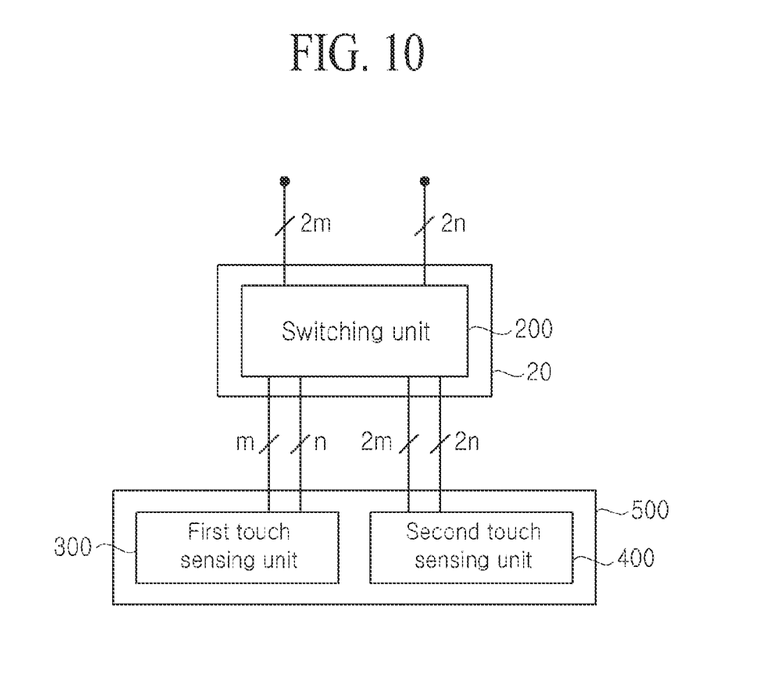
Figure 11:
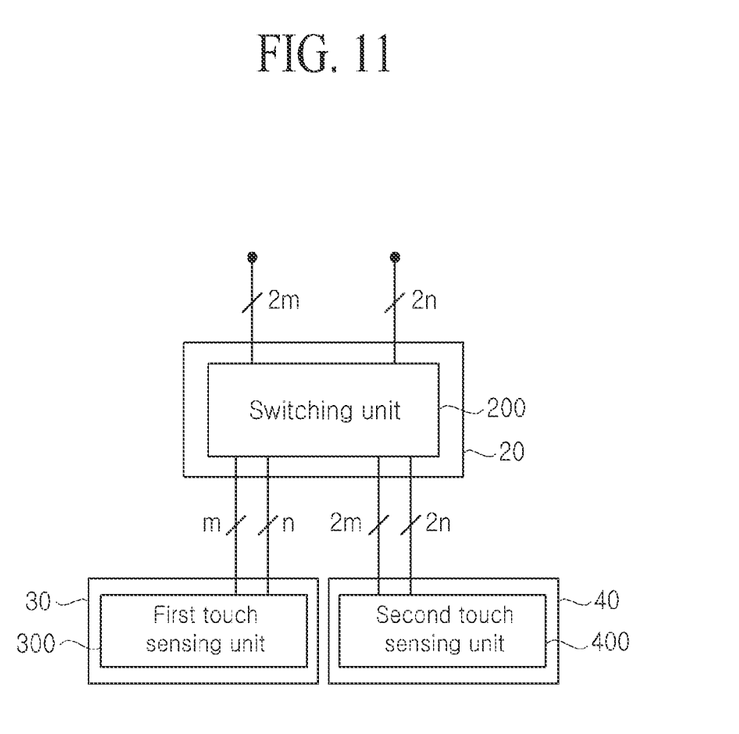

FIGS. 9 to 11 are diagrams illustrating embodiments of a circuit unit including the switching unit, the first touch sensing unit, and the second touch sensing unit of FIG. 1.

First, as illustrated in FIG. 9, the switching unit 200, the first touch sensing unit 300, and the second touch sensing unit 400 may be included in one touch IC 500.

For example, the one touch IC 500 may perform a switching function of the switching unit 200 that transfers the common voltage for the display driving mode and the touch scan pulse for the touch driving mode to the plurality of first and second electrodes 112 and 114, a function of the first touch sensing unit 300 that senses a touch in the mutual capacitive type, and a function of the second touch sensing unit 400 that senses a touch in the self-capacitive type.

As illustrated in FIG. 10, the switching unit 200 may be included in a display driver IC 20, and the first and second touch sensing units 300 and 400 may be included in the one touch IC 500.

The display driver IC 20 generates a gate control signal and a data control signal by using a timing signal transferred from an external system, for allowing the panel 100 to display an image, and realigns input video data signals according to a structure of the panel 100. To this end, the display driver IC 20 may further include a gate driver that applies a scan signal to a plurality of gate lines, a data driver that applies image data signals to a plurality of data lines, and a controller that controls the elements.

For example, the display driver IC 20 may perform a switching function that transfers the common voltage for the display driving mode and the touch scan pulse for the touch driving mode to the plurality of first and second electrodes 112 and 114. Also, the one touch IC 500 may perform the function of the first touch sensing unit 300, which senses a touch in the mutual capacitive type, and the function of the second touch sensing unit 400 that senses a touch in the self-capacitive type.

As illustrated in FIG. 11, the switching unit 200 may be included in the display driver IC 20, the first touch sensing unit 300 may be included in a first touch IC 30, and the second touch sensing unit 400 may be included in a second touch IC 40. In other words, each of the first touch sensing unit 300 and the second touch sensing unit 400 may be included in a separate touch IC.

For example, the first touch IC 30 including the first touch sensing unit 300 that senses a touch in the mutual capacitive type may sense the finger touch, and the second touch IC 40 including the second touch sensing unit 400 that senses a touch in the self-capacitive type may sense the pen touch.

Therefore, the display device integrated with the touch screen according to embodiments of the present invention temporally divides the touch driving mode into the first and second periods, and by using the plurality of first and second electrodes 112 and 114, can sense the pen touch as well as the finger touch without providing a separate device for sensing the pen touch. Also, the size of the touch sensing unit for sensing the pen touch is smaller than that of the touch sensing unit for sensing the finger touch, and thus, a degree of accuracy for sensing the pen touch can be enhanced.

According to the embodiments of the present invention, the display device integrated with an in-cell touch screen can sense the pen touch as well as the finger touch without a separate pen touch input device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device integrated with a touch screen, the display device comprising:
    a panel comprising a plurality of first electrodes arranged in parallel and in a first direction, and a plurality of second electrodes arranged in parallel and in a second direction;
    a switching unit configured to (i) apply a common voltage to the plurality of first electrodes and the plurality of second electrodes, during a display driving period of a frame, (ii) group the plurality of first electrodes in units of at least two electrodes and apply a first touch scan pulse to the grouped first electrodes during a first touch sensing period of the frame for sensing a user's finger touch on the panel, and (iii) individually apply a second touch scan pulse to the plurality of first electrodes and the plurality of second electrodes during a second touch sensing period of the frame for sensing a pen touch on the panel;
    a first touch sensing unit configured to apply the first touch scan pulse to the switching unit; and
    a second touch sensing unit configured to apply the second touch scan pulse to the switching unit,
    wherein the switching unit comprises:
        a first touch sensing unit connector configured to group the plurality of first electrodes in units of at least two electrodes to connect the grouped first electrodes to the first touch sensing unit and group the plurality of second electrodes in units of two electrodes to connect the grouped second electrodes to the first touch sensing unit;
        a second touch sensing unit connector configured to individually connect the plurality of first electrodes and the plurality of second electrodes to the second touch sensing unit; and
        a switch configured to connect the plurality of first electrodes and the plurality of second electrodes to the first touch sensing unit connector during the first touch sensing period and configured to connect the plurality of first electrodes and the plurality of second electrodes to the second touch sensing unit connector during the second touch sensing period.

2. The display device of claim 1,
    wherein the switching unit receives a plurality of first touch sensing signals from the grouped second electrodes, and transfers the plurality of first touch sensing signals to the first touch sensing unit during the first touch sensing period, and
    wherein the first touch sensing unit determines whether there is a touch by using the plurality of first touch sensing signals.

3. The display device of claim 1,
    wherein the switching unit receives a plurality of second touch sensing signals from the plurality of first electrodes and the plurality of second electrodes individually, and transfers the plurality of second touch sensing signals to the second touch sensing unit individually during the second touch sensing period, and
    wherein the second touch sensing unit determines whether there is a touch by using the plurality of second touch sensing signals.

4. The display device of claim 1, wherein the first touch sensing unit and the second touch sensing unit are comprised in one touch integrated circuit.

5. The display device of claim 1, wherein the first touch sensing unit and the second touch sensing unit are comprised in one touch integrated circuit and the switching unit is comprised in the one touch integrated circuit.

6. The display device of claim 1, wherein the first touch sensing unit and the second touch sensing unit are comprised in different touch integrated circuits, respectively.

7. The display device of claim 1, wherein the first touch sensing unit and the second touch sensing unit sense a touch in different types including a mutual capacitive type and a self-capacitive type within the frame.

8. The display device of claim 1, wherein the switching unit is comprised in a display driver integrated circuit that applies data voltages to the panel.

9. A touch integrated circuit comprising:
a switching unit configured to (i) output a common voltage to a plurality of first electrodes and a plurality of second electrodes that are comprised in a panel during a display driving period of a frame, (ii) group the plurality of first electrodes in units of at least two electrodes and output a first touch scan pulse to the grouped first electrodes during a first touch sensing period of the frame for sensing a user's finger touch on the panel and (iii) individually output a second touch scan pulse to the plurality of first electrodes and the plurality of second electrodes during a second touch sensing period of the frame for sensing a pen touch on the panel;
a first touch sensing unit configured to apply the first touch scan pulse to the switching unit; and
a second touch sensing unit configured to apply the second touch scan pulse to the switching unit,
wherein the switching unit comprises:
a first touch sensing unit connector configured to group the plurality of first electrodes in units of at least two electrodes to connect the grouped first electrodes to the first touch sensing unit and group the plurality of second electrodes in units of two electrodes to connect the grouped second electrodes to the first touch sensing unit;
a second touch sensing unit connector configured to individually connect the plurality of first electrodes and the plurality of second electrodes to the second touch sensing unit; and
a switch configured to connect the plurality of first electrodes and the plurality of second electrodes to the first touch sensing unit connector during the first touch sensing period and configured to connect the plurality of first electrodes and the plurality of second electrodes to the second touch sensing unit connector during the second touch sensing period.

10. The touch integrated circuit of claim 9, wherein the first touch sensing unit and the second touch sensing unit sense a touch in different types including a mutual capacitive type and a self-capacitive type within the frame.

11. The touch integrated circuit of claim 9,
wherein the switching unit receives a plurality of first touch sensing signals from the grouped second electrodes, and transfers the plurality of first touch sensing signals to the first touch sensing unit during the first touch sensing period, and
wherein the first touch sensing unit determines whether there is a touch by using the plurality of first touch sensing signals.

12. The touch integrated circuit of claim 9,
wherein the switching unit receives a plurality of second touch sensing signals from the plurality of first electrodes and the plurality of second electrodes individually, and transfers the plurality of second touch sensing signals to the second touch sensing unit individually during the second touch sensing period, and
wherein the second touch sensing unit determines whether there is a touch, by using the plurality of second touch sensing signals.

13. A display device integrated with a touch screen, the display device comprising:
a panel comprising a plurality of first electrodes arranged in parallel and in a first direction, and a plurality of second electrodes arranged in parallel and in a second direction;
a switching unit configured to (i) apply a common voltage to the plurality of first electrodes and the plurality of second electrodes, during a display driving period of a frame, (ii) group the plurality of first electrodes in units of at least two electrodes and apply a first touch scan pulse to the grouped first electrodes during a first touch sensing period of the same frame at a first touch sensing size, and (iii) individually apply a second touch scan pulse to the plurality of first electrodes and the plurality of second electrodes during a second touch sensing period of the same frame at a second touch sensing size smaller than the first touch sensing size;
a first touch sensing unit configured to apply the first touch scan pulse to the switching unit; and
a second touch sensing unit configured to apply the second touch scan pulse to the switching unit,
wherein a plurality of first sub-electrodes are connected to each other to configure one first electrode and the plurality of first sub-electrodes are electrically connected to each other in a non-display area of the panel.

14. The display device of claim 13, wherein the switching unit connects the grouped first electrodes to the first touch sensing unit during the first touch sensing period and groups the plurality of second electrodes in units of at least two electrodes to connect the grouped second electrodes to the first touch sensing unit during the first touch sensing period.

15. The display device of claim 13,
wherein the switching unit is further configured to group the plurality of second electrodes in units of at least two electrodes during the first touch sensing period,
wherein the switching unit receives a plurality of first touch sensing signals from the grouped second electrodes, and transfers the plurality of first touch sensing signals to the first touch sensing unit during the first touch sensing period, and
wherein the first touch sensing unit determines whether there is a touch by using the plurality of first touch sensing signals.

16. The display device of claim 15,
wherein the switching unit receives a plurality of second touch sensing signals from the plurality of first electrodes and the plurality of second electrodes individually, and transfers the plurality of second touch sensing signals to the second touch sensing unit individually during the second touch sensing period, and
wherein the second touch sensing unit determines whether there is a touch by using the plurality of second touch sensing signals.

17. The display device of claim 13, wherein the switching unit individually connects the plurality of first electrodes and the plurality of second electrodes to the second touch sensing unit during the second touch sensing period.

18. The display device of claim 13, wherein the first touch sensing unit and the second touch sensing unit are comprised in one touch integrated circuit and the switching unit is comprised in the one touch integrated circuit.

19. The display device of claim 13, wherein the first touch sensing unit and the second touch sensing unit sense a touch in different types including a mutual capacitive type and a self-capacitive type within the frame.

20. The display device of claim 13, wherein the second touch sensing unit senses a pen touch on the panel.

21. A touch integrated circuit comprising:
a switching unit configured to (i) output a common voltage to a plurality of first electrodes and a plurality of second electrodes that are comprised in a panel during a display driving period of a frame, (ii) group the plurality of first electrodes in units of at least two electrodes and output a first touch scan pulse to the grouped first electrodes during a first touch sensing period of the same frame at a first touch sensing size, and (iii) individually output a second touch scan pulse to the plurality of first electrodes and the plurality of second electrodes during a second touch sensing period of the same frame at a second touch sensing size smaller than the first touch sensing size;
a first touch sensing unit configured to apply the first touch scan pulse to the switching unit; and
a second touch sensing unit configured to apply the second touch scan pulse to the switching unit,
wherein a plurality of first sub-electrodes are connected to each other to configure one first electrode and the plurality of first sub-electrodes are electrically connected to each other in a non-display area of the panel.

22. The touch integrated circuit of claim 21, wherein the switching unit connects the grouped first electrodes to the first touch sensing unit during the first touch sensing period and groups the plurality of second electrodes in units of at least two electrodes to connect the grouped second electrodes to the first touch sensing unit during the first touch sensing period.

23. The touch integrated circuit of claim 21, wherein the switching unit individually connects the plurality of first electrodes and the plurality of second electrodes to the second touch sensing unit during the second touch sensing period.

* * * * *